(12) United States Patent
Nanda et al.

(10) Patent No.: US 9,116,704 B1
(45) Date of Patent: *Aug. 25, 2015

(54) DELAYING THE INITIATION OF TRANSITIONING TO A LOWER POWER MODE BY PLACING A COMPUTER SYSTEM INTO AN INTERMEDIATE POWER MODE BETWEEN A NORMAL POWER MODE AND THE LOWER POWER MODE

(71) Applicant: GOOGLE INC., Mountain View, CA (US)

(72) Inventors: Sameer Nanda, San Jose, CA (US); Ryan Cairns, Los Altos, CA (US); Ryan Tabone, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/187,976

(22) Filed: Feb. 24, 2014

Related U.S. Application Data

(63) Continuation of application No. 13/116,803, filed on May 26, 2011, now Pat. No. 8,671,299.

(51) Int. Cl.
*G06F 1/26* (2006.01)
*G06F 1/32* (2006.01)

(52) U.S. Cl.
CPC ............... *G06F 1/3293* (2013.01); *G06F 1/26* (2013.01)

(58) Field of Classification Search
CPC ..................................... G06F 1/32; G06F 1/26
USPC .......................................... 713/320, 324, 340
See application file for complete search history.

(56) References Cited

U.S. PATENT DOCUMENTS

| 5,194,895 A | 3/1993 | Bares |
| 5,303,171 A | 4/1994 | Belt |

(Continued)

FOREIGN PATENT DOCUMENTS

| CN | 1491378 A | 4/2004 |
| EP | 1480113 A2 | 11/2004 |

(Continued)

OTHER PUBLICATIONS

"Screen Saver Taking Longer to Start ? In Windows 7 and Vista", Windows 7 Hacker, Aug. 24, 2009, 5 pages.

(Continued)

*Primary Examiner* — Jaweed A Abbaszadeh
*Assistant Examiner* — Phil Nguyen
(74) *Attorney, Agent, or Firm* — Brake Hughes Bellermann LLP

(57) ABSTRACT

A method may include operating a device in a first power mode, setting flag(s), each flag representing an executing task, detecting a request to place the device in a second power mode. The second power mode consumes less system resources than the first power mode, and delaying the transition to the second power mode by placing the device in a third power mode that consumes less system resources than the first power mode but more than the second power mode. While in the third power mode, the method may include estimating an amount of system resources required for each of the task(s), determining if the total estimated amount of system resources to complete each of the task(s) exceeds one or more system resource threshold values, and if the estimated total amount of system resources exceeds the one or more system resource threshold values, ceasing execution of the task(s).

20 Claims, 5 Drawing Sheets

(56) References Cited

U.S. PATENT DOCUMENTS

| | | |
|---|---|---|
| 5,659,762 A | 8/1997 | Sawada et al. |
| 5,710,931 A | 1/1998 | Nakamura |
| 5,781,448 A | 7/1998 | Nakamura |
| 6,065,121 A | 5/2000 | Hobson et al. |
| 6,516,421 B1 | 2/2003 | Peters |
| 6,654,895 B1 | 11/2003 | Henkhaus et al. |
| 6,711,447 B1 | 3/2004 | Saeed |
| 6,732,280 B1 | 5/2004 | Cheok |
| 6,738,068 B2 | 5/2004 | Cohen |
| 7,185,229 B2 | 2/2007 | Cromer |
| 7,328,358 B1 | 2/2008 | Holmer |
| 7,383,457 B1 | 6/2008 | Knight |
| 8,063,872 B2 | 11/2011 | Forstall et al. |
| 8,245,062 B1 | 8/2012 | Nanda et al. |
| 8,281,166 B2 | 10/2012 | Carroll |
| 8,351,813 B2 | 1/2013 | Hashimoto |
| 8,375,208 B2 | 2/2013 | Darapu et al. |
| 8,671,299 B2 | 3/2014 | Nanda et al. |
| 2002/0085008 A1 | 7/2002 | Jain et al. |
| 2003/0233587 A1 | 12/2003 | Sanu |
| 2005/0010748 A1 | 1/2005 | Osborn |
| 2005/0110746 A1 | 5/2005 | Hou |
| 2005/0182612 A1 | 8/2005 | Anderson et al. |
| 2006/0129703 A1 | 6/2006 | Oshikawa et al. |
| 2006/0130046 A1 | 6/2006 | O'Neill |
| 2006/0136154 A1 | 6/2006 | Bliley et al. |
| 2006/0136728 A1 | 6/2006 | Gentry et al. |
| 2006/0200691 A1 | 9/2006 | Yomo |
| 2006/0267972 A1 | 11/2006 | Yi |
| 2007/0050654 A1 | 3/2007 | Switzer et al. |
| 2007/0169088 A1 | 7/2007 | Lambert |
| 2007/0252552 A1 | 11/2007 | Walrath |
| 2007/0257998 A1 | 11/2007 | Inoue |
| 2008/0297463 A1 | 12/2008 | Tsuru et al. |
| 2009/0164821 A1 | 6/2009 | Drescher |
| 2009/0172440 A1 | 7/2009 | Kant et al. |
| 2009/0240932 A1 | 9/2009 | Hattori et al. |
| 2009/0296617 A1 | 12/2009 | Lin et al. |
| 2009/0320055 A1 | 12/2009 | Langille et al. |
| 2010/0036921 A1 | 2/2010 | Ananthanarayanan et al. |
| 2010/0153764 A1 | 6/2010 | Pratt |
| 2010/0174928 A1 | 7/2010 | Borghetti et al. |
| 2010/0295774 A1 | 11/2010 | Hennessey |
| 2011/0074752 A1 | 3/2011 | Kikuchi |
| 2011/0083026 A1 | 4/2011 | Mikami et al. |
| 2011/0264937 A1 | 10/2011 | Meisner et al. |
| 2012/0303990 A1 | 11/2012 | Nanda et al. |
| 2013/0082916 A1 | 4/2013 | Dixit |

FOREIGN PATENT DOCUMENTS

| | | |
|---|---|---|
| JP | 2004-334877 A | 11/2004 |
| JP | 2005-079889 A | 3/2005 |
| JP | 2005-235208 A | 9/2005 |
| JP | 2006-100935 A | 4/2006 |
| WO | 03/094428 A2 | 4/2003 |

OTHER PUBLICATIONS

Kazadorl, "Windows 7 computer goes into Sleep Mode while there is system activity", Microsoft Corporation, May 8, 2010, 7 pages.

"Mac OS X: Why your Mac might not sleep or stay in sleep mode", Jun. 11, 2008, 6 pages.

Stemen, "Integrating Drivers and Applications with Windows Power Management", Microsoft Corporation, 2006, 35 pages.

Office Action for CN Appl. No. 201210167818.3, mailed Mar. 22, 2013, 19 pages.

Office Action Response for JP Application No. 2012-119138, filed on Apr. 16, 2013, 6 pages.

Extended EP Search Report for EP Application No. 12004091.0, mailed Aug. 17, 2012, 9 pages.

Office Action for JP Application No. 2012-119138, mailed Oct. 16, 2012, 8 pages.

"Managing Power with Group Policy: Part 2 of 3", Ask the Directory Services Team, Mar. 19, 2008, 2 pages.

Office Action for CN Application No. 201210167818.3, mailed Aug. 19, 2013, 6 pages.

Office Action for JP Application No. 2012-119138, mailed Jun. 4, 2013, 3 pages.

Office Action Response for EP Application No. 12004091.0, mailed Jan. 10, 2014, 18 pages.

Office Action for CN Application No. 201210167818.3, mailed Nov. 7, 2013, 3 pages.

Office Action Response for CN Application No. 201210167818.3, filed Jan. 20, 2014, 10 pages.

Office Action Response for CN Application No. 201210167818.3, filed Aug. 2, 2013, 2 pages.

Office Action Response for CN Application No. 201210167818.3, filed Oct. 18, 2013, 6 pages.

Office Action Response for JP Application No. 2012-119138, filed Oct. 3, 2013, 16 pages.

Office Action Response for JP Application No. 2012-119138, filed Apr. 16, 2013, 8 pages.

Non Final Office Action for U.S. Appl. No. 13/300,068, mailed on Mar. 14, 2014, 14 pages.

Office Action for Japanese Patent Application No. 2013-206964, mailed on Aug. 26, 2014, 10 pages.

DELAYING THE INITIATION OF TRANSITIONING TO A LOWER POWER MODE BY PLACING A COMPUTER SYSTEM INTO AN INTERMEDIATE POWER MODE BETWEEN A NORMAL POWER MODE AND THE LOWER POWER MODE

CROSS REFERENCE TO RELATED APPLICATION

This application is a Continuation of, and claims priority to, U.S. patent application Ser. No. 13/116,803, filed on May 26, 2011, entitled "DELAYING THE INITIATION OF TRANSITIONING TO A LOWER POWER MODE BY PLACING A COMPUTER SYSTEM INTO AN INTERMEDIATE POWER MODE BETWEEN A NORMAL POWER MODE AND THE LOWER POWER MODE", the disclosure of which is incorporated by reference herein in its entirety.

TECHNICAL FIELD

This description relates to the power management of a computing device, and more specifically to the delay or postponement of a change of the power state of the computing device based upon one or more tasks being performed by the computing device.

BACKGROUND

Modern computing devices (e.g., desktop computers, laptops, netbooks, tablets, smartphones, etc.) can generally operate in one of a plurality of power modes or power states. These power modes may range from a "working" power mode, in which the computing device is fully powered and operational, to an "off" power mode in which the device is fully powered down and non-operational. Traditionally this "working" power mode is the default operating mode of computing devices. However, there are power modes between these two power modes (working and off) that trade-off performance characteristics of some functions in exchange for power savings or reduced power consumption.

For example, a low-power state of a computing device may be referred to as "Standby," "Sleep," "Suspend to RAM," "Suspend to Memory," or "Suspend." Advanced Configuration and Power Interface (ACPI) power state S3. In such a low-power state, aside from powering the random access memory ("RAM") that is required to restore the computing device's state, the computing device attempts to reduce or cut power to all unneeded parts of the machine (e.g., the hard disk(s) stop spinning, the display device is placed into a dark or low-power state, and peripheral devices are de-powered). Such a low-power state often is called Stand By (for computing devices running a Microsoft Windows 95—Server 2003 operating system), or is called Sleep (for computing devices running an Apple operating system or a Windows Vista, Windows 7, Windows Server 2008 operating system), or Suspend (for computing devices running a Linux operating system). In such a state, the processing functions of the computing device are powered down, and some small amount of power is used to preserve the contents of RAM and support waking up the computing device from the low-power state into the normal, working, or full power state.

When the computing device is placed into the Standby, Sleep, or Suspend to RAM state, it typically consumes less than about 20% of the total power than is consumed with the device is in the working or full power mode. However, while power consumption is greatly reduced compared to the Working power mode, the Sleep power mode requires that power be constantly supplied and consumed in order to power or refresh the volatile memory (e.g., RAM) lest the operating state be erased from the volatile memory.

In another example implementation, a low-power state of the computing device may be referred to as "Hibernate," "Hibernation," "Safe Sleep," "Suspend to Disk," "Suspend to File," or ACPI power state S4. In such a state the contents of the computing device's RAM are written to non-volatile storage such as a hard disk, as a file or on a separate partition, before powering off the computing device. When the computing device is restarted it reloads the data that had been written to the non-volatile memory and is restored to the state it was in when hibernation was invoked. To enable hibernation, the hard disk must have sufficient free space to store all non-replaceable contents of RAM.

Such a low-power state often is called Hibernate (for computing devices running a Microsoft Windows 95—Server 2003, and Windows 7 operating system), Fast Sleep (for computing devices running a Microsoft Vista operating system), Safe Sleep (for computing devices running an Apple operating system), or Suspend to Disk (for computing devices running a Linux operating system). When the computing device is placed into the Hibernate, Safe Sleep, or Suspend to Disk state, it typically consumes about as much power as is consumed when the device is powered off. Hibernating and later restarting is usually faster than closing down, later starting up, and starting all the programs that were running.

SUMMARY

According to one general aspect, a method may include operating a computing device in a first power mode, setting at least one flag, each flag representing a respective one of at least one task being executed on the computing device, detecting a request to place the computing device in a second power mode, wherein the second power mode consumes less system resources than the first power mode, and delaying the initiation of the transition of the computing device to the second power mode by placing the computing device in a third power mode that consumes less system resources than the first power mode but more than the second power mode. While in the third power mode, the method may include estimating an amount of system resources required for each of the at least one task, determining if the total estimated amount of system resources to complete each of the at least one task exceeds one or more system resource threshold values, and if the estimated total amount of system resources exceeds the one or more system resource threshold values, ceasing execution of the at least one task.

According to another general aspect, a computing device may include a processor configured to operate the computing device in a first power mode, and set at least one flag, each flag representing a respective one of at least one task being executed on the computing device. The computing device may further include a power manager configured to receive a request to place the computing device in a second power mode, wherein the second power mode consumes less system resources than the first power mode, delay the initiation of the transition of the computing device to the second power mode by placing the computing device in a third power mode that consumes less system resources than the first power mode but more than the second power mode. While in the third power mode the power manager may be further configured to estimate an amount of system resources required for each of the at least one task, determine if the total estimated amount of system resources to complete each of the at least one task exceeds one or more system resource threshold values, and if the estimated total amount of system resources exceeds the one or more system resource threshold values, ceasing execution of the at least one task.

According to still another general aspect, a computer program product for managing system resources, the computer program product being tangibly embodied on a computer-readable medium and including executable code that, when executed, may be configured to cause a computing apparatus to operate a computing device in a first power mode, set at least one flag each flag representing a respective one of at least one task being executed on the computing device, receive a request to place the computing device in a second power mode, wherein the second power mode consumes less system resources than the first power mode, delay the initiation of the transition of the computing device to the second power mode by placing the computing device in a third power mode that consumes less system resources than the first power mode but more than the second power mode. While in the third power mode the executable code may be further configured to cause the computing apparatus to estimate an amount of system resources required for each of the at least one task, determine if the total estimated amount of system resources to complete each of the at least one task exceeds one or more system resource threshold values, and if the estimated total amount of system resources exceeds the one or more system resource threshold values, ceasing execution of the at least one task.

Implementations can include one or more of the following features. For example, the first power mode may include a working power mode, and the second power mode may include a suspend to random access memory (RAM) power mode. The at least one task includes a task configured to execute as a background process.

For example, while in the third power mode detecting when a substantial change in system resources by the computing device has occurred, determining if the substantial change in system resources exceeds the one or more system resource threshold values, and if the substantial change in system resources exceeds the one or more system resource threshold values transitioning the computing device to the second power mode. A substantial change in system resources includes the computing device exiting a first network and joining a second network.

For example, Each of the at least one task has a different associated system resource threshold value. After detecting a request to place the computing device in a second power mode, detecting a request to place the computing device in the first power mode, if the request to place the computing device in the first power mode occurs prior to the completion of the at least one task, withdrawing the request to place the computing device in a second power mode. Withdrawing the request to place the computing device in a second power mode includes placing the computing device in the first power mode. Placing the computing device in a third power mode includes turning off a display included by the computing device. Estimating an amount of system resources required based on each of the at least one task includes estimating a network bandwidth, and determining if the estimated amount of system resources to complete the at least one task exceeds the one or more system resource threshold values includes determining if the estimated amount of system resources to complete the at least one task exceeds a network bandwidth threshold value.

BRIEF DESCRIPTION OF THE DRAWINGS

Like reference symbols in the various drawings indicate like elements.

DETAILED DESCRIPTION

Figure 1:
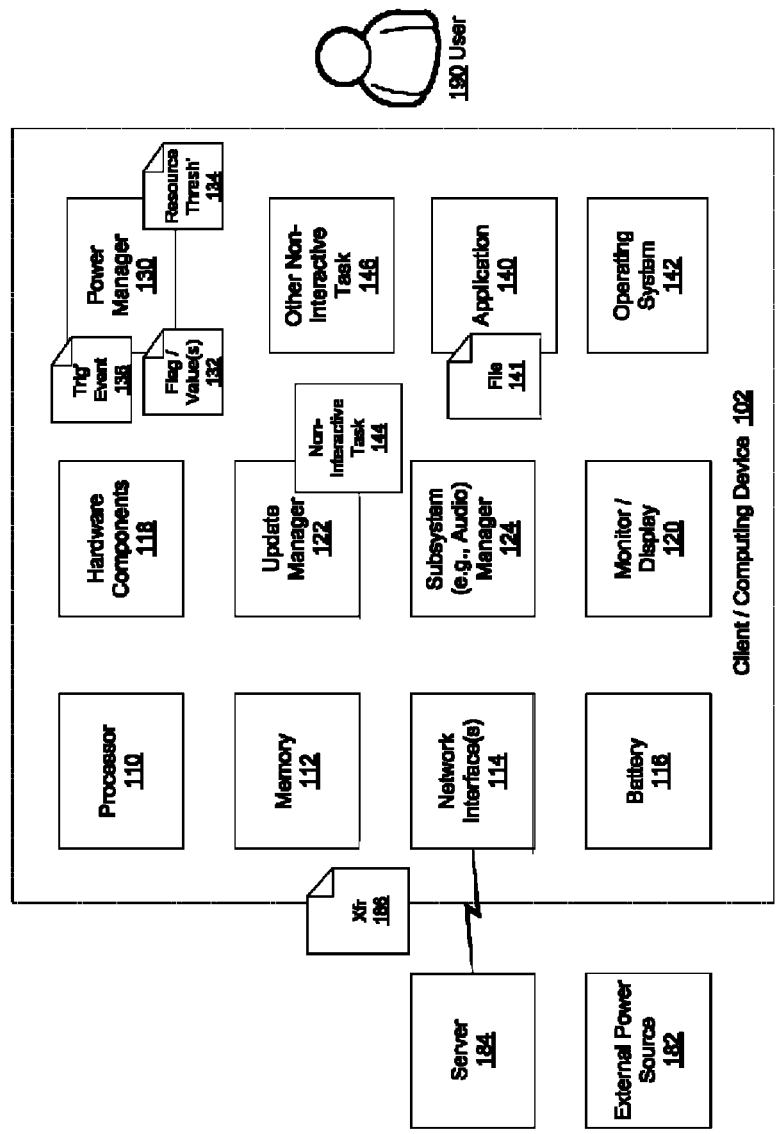
FIG. 1 is a block diagram of an example embodiment of a system in accordance with the disclosed subject matter.

FIG. 1 is a block diagram of an example embodiment of a system 100 in accordance with the disclosed subject matter. In various embodiments, the system 100 may include a client or computing device 102 which is controlled or used by a user 190. In some embodiments, the computing device 102 may include a desktop computer, a laptop, a tablet, a smartphone, a dedicated specialized computing device or other device configured to process information.

In some embodiments, the computing device 102 may include a processor 110 configured to process or execute instructions, such as instructions definition or included by an application 140 or non-interactive task 144, etc. The computing device 102 may include one or more memory elements 112 (e.g., volatile memory or non-volatile memory, etc.) configured to store instructions and/or data. In various embodiments, the computing device 102 may include a battery 116 or other power supply configured to provide power to the computing device 102. In some embodiments, the computing device 102 may be configured to receive power from an external power source 182. In some embodiments, the computing device 102 may include a monitor or display 120 to graphically display information to the user 190. In various embodiments, other hardware components 118 (e.g., speakers, keyboard, touchscreen, sensors, etc.) may be included in the computing device 102.

Also, in some embodiments, the computing device 102 may include one or more network interfaces 114 configured to facilitate the operation of the computing device 102 within a networking environment. In various embodiments, the network interfaces 114 may include a wireless network interface, a wired network interface, a wireless local area network (WLAN) interface (e.g., an interface substantially compliant with Institute of Electrical and Electronics Engineers (IEEE) wireless networking standard 802.11b, 802.11g, 802.11n, etc.), or a cellular network interface (e.g., an interface substantially compliant with the cellular communications standards of Code division multiple access (CDMA), 2000 Global System for Mobile Communications (GSM), 3rd Generation Partnership Project (3GPP), Long Term Evolution (LTE), etc.), or other networking interfaces (e.g., Bluetooth, etc.). It is understood that the above are merely a few illustrative examples to which the disclosed subject matter is not limited.

In various embodiments, the computing device 102 may execute one or more tasks (e.g., application 140, non-interactive task 144, etc.). In some embodiments, some of these tasks may involve interaction with the user 190. Such interactive tasks may include the application 140 (e.g., a word processor, a web browser, etc.). Conversely, other tasks may not involve user 190 interaction or may involve minimal user interaction. These non-interactive tasks 114 and 146 may also be referred to as a "background tasks" or "background processes". Generally such non-interactive tasks 144 are tasks or processes that execute "behind the scenes" and require little if any interaction with the user 190. Such non-interactive tasks 144 may include, but are not limited to, tasks such as: updating software, downloading files, logging, system monitoring, scheduling, etc.

In various embodiments, a task may switch state between interactive (foreground) and non-interactive (background) processing and status. For example, an application 140 (e.g., a music player, a download program, etc.) may start in an interactive mode and may be placed in the background or non-interactive state, at which point the task may be considered a non-interactive task 144. In another embodiment, a non-interactive task 144 may be initiated by a subsystem 124, component, or other process (e.g., update manager 122, audio manager, download manager, digital rights manager, system scheduler, etc.) executed by the computing device 102. As such, a non-interactive task 144 may occur without the knowledge or interaction of the user 190. Also, a non-interactive task 144 may be initiated based upon a schedule, an event internal to the computing device 102 (e.g., an error or message from an application 140, a message from a hardware component, such as a network interface 114, etc.), or an external event (e.g., a message from an external server 184, such as a software update notification, the removal of a power source 182, etc.). It is understood that the above are merely a few illustrative examples to which the disclosed subject matter is not limited.

In various embodiments, the computing device 102 may be configured to operate in one or more power modes (e.g., the Working power mode, Suspend power mode, the ACPI power mode (as described above), etc.). In such embodiments, the computing device 102 may be configured to transition from a first power mode (e.g., the Working power mode) to a second, third, or even fourth power mode (e.g., the Suspend power mode, the Hibernation power mode, the Off power mode, etc.). Likewise, the computing device 102 may also be configured to transition from the second (or other) power mode to the first power mode or another power mode.

In such an embodiment, a power manager 130, included by the computing device 102, may receive a request (e.g., from a user 190, a network interface 114 or other source, etc.) to change between two power modes (e.g., Working to Suspend, Off to Working, etc.). Traditionally, the power manager 130 may place the computing device 102 in the requested power mode substantially instantaneously or without intentional delay. However, in the illustrated embodiment, the power manager 130 may intentionally delay the changing of power modes based upon one or more delaying conditions, some of which are described in more detail below.

In one embodiment, the computing device 102 may execute a non-interactive task 144. In the illustrated embodiment, the non-interactive task 144 may be initiated by an update manager 122. In such an embodiment, the server 184 may inform the update manager 122 that one or more pieces of software (e.g., application 140, etc.) may need updating. The update manager 122 may then initiate the update task 144. This update task 144 may be a non-interactive process that requires little if any interaction by the user 190. In such an embodiment, the update may occur in the "background" without being directly seen by or requiring the intervention of the user 190. In such an embodiment, the update task 144 may include downloading or transferring (Xfr) 184 one or more files from a server 184. It is understood that the above is merely one illustrative example to which the disclosed subject matter is not limited.

In another embodiment, other non-interactive tasks 146 may be executed by the computing device 102. For example, in one embodiment, the application 140 may initiate a non-interactive task 146, such as the uploading/downloading of a file 141, a creation or processing of a file 141 (e.g., a video encoding, compiling source code into an executable file, etc.), the monitoring of a system process or other application, etc. I It is understood that the above are merely a few illustrative examples to which the disclosed subject matter is not limited. In yet another embodiment, another subsystem 124 or operating system 142 included by the computing device 102 may initiate a non-interactive task 144. In various embodiments, such subsystems may include an input device manager, an audio manager subsystem, a digital rights manager, etc. For example, an operating system 142 may initiate a garbage collection to reduce the usage of the memory 112, or an audio manager may stream an audio signal from a server 184 (e.g., an internet radio station, etc.). It is understood that the above are merely a few illustrative examples to which the disclosed subject matter is not limited.

While it is understood that the above are merely a few illustrative examples to which the disclosed subject matter is not limited, the illustrated embodiment will be discussed using the example of an update process non-interactive task 144 initiated by the update manager 122. It is understood that other non-interactive tasks 146 may be initiated or controlled by other techniques and that tasks other than updating software may be may be included in other embodiments.

In the illustrated embodiment, the update manager 122 may initiate the non-interactive task 144. In one embodiment, the update manager 122 or operating system 142 may inform the power manager 130 that a non-interactive task 144 is being executed by the computing device 102. While described in more detail in reference to FIG. 3, in the illustrated embodiment of FIG. 1 the update manager 122 or other component may set a flag (e.g., a 1-bit value or a multi-bit value) 132 in a memory portion of the power manager 130 or portion of the memory 112 indicating that the non-interactive task 144 is being executed. Conversely, when the non-interactive task 144 is completed or is no longer being executed, the flag 132 may be cleared. In such an embodiment, the power manager 130 may only concern itself with tasks that are associated with a respective flag 132. It is understood that the above is merely one illustrative example to which the disclosed subject matter is not limited.

In the illustrated embodiment, the power manager 130 may detect or receive a request to place the computing device 102 in a reduced power mode. The computing device 102 may already be operating in a first power mode, such as the Working power mode. The reduced power mode may include a power mode (e.g., the Suspend power mode, or Hibernation power mode, etc.) that consumes fewer system resources than the first or Working power mode.

In this context, "system resources" include processing resources (e.g., provided by the processor 110), memory utilization (provided by the memory 112), power or electrical consumption (provided by the battery 116 or external power source 182), network resources, such as bandwidth utilization, bandwidth cost (e.g., each megabyte transferred may cost a user 190 money, etc.), etc. In various embodiments, the power manager 130 may be configured to monitor and/or predict the amount of system resources the computing device 102 consumes or is likely to consume in a given power mode (e.g., Working power mode). Also, the power manager 130 may monitor or be made aware of the level of various system resources of the computing device 102 (e.g., the battery charge level, amount of bandwidth remaining in the user 190's monthly network usage limit, etc.)

In the illustrated embodiment, the power manager 130 may detect that a non-interactive task 144 is being executed by the computing device 102. The power manager 130 may delay transitioning the computing device 102 to the requested second power mode until the non-interactive task 144 is complete. In such an embodiment, the computing device 102 may remain in the first or Working power mode until the non-interactive task 144 is complete.

In some embodiments, if the power manager 130 were to transition the computing device 102 to the second or reduced power mode before the non-interactive task 144 was complete, the non-interactive task 144 may fail (in whole or part). For example, if an update task 144 is downloading a file (transfer 186), placing the computing device 102 in the Suspend power mode may cause the file to either not to be downloaded or for the partially-downloaded version to be corrupted. In such an embodiment, once the computing device 102 re-enters the Working power mode, the update manager 122 may request that the entire file be transferred or downloaded again. In such an embodiment, the system resources (e.g., network bandwidth, user 190 network usage limits, etc.) used to partially download the aborted or failed update file, prior to the Suspend power state, may be wasted. Other forms of failed or partially completed non-interactive tasks 144 and the consequences of such failure or partial completion may be contemplated. It is understood that the above is merely one illustrative example to which the disclosed subject matter is not limited.

In the illustrated embodiment, may delay transitioning the computing device 102 to the requested second power mode until the non-interactive task 144 is complete. In some embodiments, the non-interactive task 144 or the component, subsystem, or program associated with the non-interactive task 144 may indicate to the power manager 130 when the non-interactive task 144 has completed. In some embodiments, this may include sending a message to the power manager 130 or, in another embodiment, writing or clearing a value from a memory location that is periodically checked by the power manager 130. It is understood that the above are merely a few illustrative examples to which the disclosed subject matter is not limited.

In some embodiments, the completion of the non-interactive task 144 may end in full or partial failure, as opposed to only successful completion. For example, a non-interactive task 144 may include receiving a file from a network resource (e.g., server 184, etc.). During the transfer 186 the network resource 184 may become unavailable (the server 184 may crash, go offline, etc.) and the non-interactive task 144 may fail due to the inability to finish the transfer 186. In such an embodiment, the power manager 130 may consider the non-interactive task 144 to have completed, and then cease delaying the transition of the computing device 102 to the requested second power mode. As described above, the non-interactive task 144 or the component, subsystem, or program associated with the non-interactive task 144 may indicate to the power manager 130 when the non-interactive task 144 has completed even if the non-interactive task 144 was unsuccessful in completing its designated task. It is understood that the above are merely a few illustrative examples to which the disclosed subject matter is not limited.

In one embodiment, the power manager 130 may be configured to both detect that a non-interactive task 144 is being executed and determine if the computing device 102 includes sufficient system resources to postpone or delay the transition between the first power mode and the second power mode. In such an embodiment, the power manager 130 may include one or more system resource threshold values or rules 134. In a simple embodiment, the power manager 130 may include a threshold level or rule 132 that indicates that the transition to the second power mode may be delayed if the computing device 102 is utilizing an external power source 182 (e.g., essentially unlimited electrical power, etc.), but not if the computing device 102 is utilizing the battery 116 (e.g., a finite amount of electrical power, etc.).

In other embodiments, more complex rules or thresholds 132 may be employed by the power manager 130. For example, the power manager 130 may determine if the network interface is utilizing a WLAN connection (e.g., likely an unmetered or free networking connection, a medium bandwidth or throughput connection, etc.) or a cellular networking connection (e.g., a metered or expensive network connection, a low bandwidth or throughput network connection, etc.). In such an embodiment, the power manager 130 may determine whether or not to delay the transition of the computing device 102 based upon type of system resources provided (e.g., WLAN versus cellular, etc.) and/or the amount of system resources (e.g., battery 116 versus external power source 184, cellular bandwidth usage limits, etc.), or other factors (e.g., the expected rate of consumption of the system resources, such as the user 190's cellular bandwidth usage, cellular bandwidth usage limit, and amount of time until the cellular bandwidth usage limit is renewed; the amount of time since the reduced power mode was requested, etc.). It is understood that the above are merely a few illustrative examples to which the disclosed subject matter is not limited.

In some embodiments, the power manager 130 may actively monitor the system resources levels and compare these system resource levels to the thresholds 134 during the period of time in which the transition to the reduced power mode is delayed. In such an embodiment, if the system resource levels exceed or otherwise cross the threshold levels 134, the power manager 130 may be configured to cease postponing the transition into the reduced power mode and instead transition the computing device 102 to the reduced power mode regardless of whether or not the non-interactive task 144 is still being executed.

In various embodiments, such an event (e.g., exceeding the system resource thresholds, etc.) may be generalized via the term "overriding triggering event". In this context, an overriding triggering event 136 may include any event, monitored or received by the power manager 130, which causes the power manager 130 to cease postponing the transition to the reduced power mode. Such overriding triggering events 136 may include, but are not limited to, changes in system resource levels, a request for the first or a third power mode, a system error (e.g., loss/removal of the battery 118, a parity error in memory 112, etc.), a user 190 initiated override of the reduced power mode postponement, etc. It is understood that the above are merely a few illustrative examples to which the disclosed subject matter is not limited.

In some embodiments, upon the receipt or recognition of an overriding triggering event 134, the power manager 130 may transition the computing device to the reduced power mode substantially instantly or without further abnormal delay. It is understood that the process of transitioning between power modes may normally take some time, for example to write information (e.g., operating state, memory contents, etc.) to the storage medium dictated by the targeted or newer power mode (e.g., volatile memory for the Suspend power mode, non-volatile memory for the Hibernation power mode, etc.). In such an embodiment, the delay included in the normal transitioning process may occur.

However, in other embodiments, the power manager 130 may base its reaction to the overriding triggering event 134 on a set of rules that associate one or more types of overriding triggering events 134 with respective actions. For example, if the overriding triggering event 134 is caused by the reduction of system resources below the threshold values 134, the power manager 130 may place the computing device 102 in the reduced power mode, as described above.

Conversely, if the overriding triggering event 134 is caused by a request to place the computing device in the first or Working power mode, the power manager 130 may ignore or withdraw the prior request to place the place the computing device 102 in the reduced power mode, leaving the computing device 102 in the Working power mode if the postponement of the reduced power mode meant the computing device was never removed for the first or Working power mode. In yet another embodiment, if the overriding triggering event 134 is caused by a request to place the computing device in a third or Hibernation power mode, the power manager 130 may ignore or withdraw the prior request to place the computing device 102 in the second of Suspend power mode, and instead postpone placing the computing device 102 in the newly requested third or Hibernation power mode. In such an embodiment, the power manager 130 may re-evaluate whether or not the postponement of the transition to the third power mode may occur. In various embodiments, the power manager 130 may include different thresholds or rule sets for different power modes or power mode transitions (e.g., from Working to Suspend, from Working to Hibernation, etc.). It is understood that the above are merely a few illustrative examples to which the disclosed subject matter is not limited.

As described below in reference to FIG. 3, the power manager 130 may base its decision whether to postpone the transition to the requested power mode, at least in part, upon information provided by the component, subsystem, or program associated with the non-interactive task 144. For example, in various embodiments, the update manager 122 (or respective subsystem in other embodiments) may indicate to the power manager 130 not only that a non-interactive task 144 is being executed but also information regarding the expected execution of that non-interactive task 144. In some embodiments, the update manager 122 may indicate to the power manager 130 how much time the non-interactive task 144 will take to complete (e.g., in seconds, processor 110 clock cycles, etc.), or may indicate how much of one or more system resources the execution of the non-interactive task 144 is expected to consume (e.g., megabytes of bandwidth, processor 110 clock cycles, memory 112 usage, etc.). In various embodiments, these values may be included with, or as part of, the flags or values 132. It is understood that the above are merely a few illustrative examples to which the disclosed subject matter is not limited.

In some embodiments, the component, subsystem, or program associated with the non-interactive task 144 may update the power manager 130 if the estimation or information regarding the non-interactive task 144 changes. For example, in one embodiment, the estimation of time to complete the non-interactive task 144 may be increased, or decreased. Likewise, the estimates of the amount of system resources the non-interactive task 144 will take to complete may be adjusted or updated. In various embodiments, the power manager 130 may request such updates. The power manager 130 may then re-evaluate the decision to postpone the transition based on the updated information. In another embodiment, the component, subsystem, or program associated with the non-interactive task 144 may provide the updates in an unsolicited fashion. It is understood that the above are merely a few illustrative examples to which the disclosed subject matter is not limited.

In such an embodiment, the power manager 130 may compare the indicated system resource usage, time until completion, or other indicated information regarding the non-interactive task 144 to one or more thresholds 134, as described above. For instance the update manager 122 may indicate that the update non-interactive task 144 is expected to complete after 10 minutes (e.g., $6 \times 10^{12}$ cycles at a cycle frequency of 1 GHz). The power manager 130 may determine that, prior to the received request to transition to the reduced power mode, the update non-interactive task 144 had executed for 8 minutes, and therefore 2 minutes more of execution is expected. The power manager 130 may then determine if a 2 minute postponement of the reduced power mode is acceptable within the predefined thresholds or rules 134. In another embodiment, the power manager 130 may compute or estimate the amount of system resources that are likely to be consumed, for example, by an average process and compare that system resource consumption to the predefined thresholds or rules 134.

In yet another embodiment, the update manager 122 may indicate that a certain amount of data (e.g., as measured in megabytes) is expected to be downloaded by the update non-interactive task 144. Again, the power manager 130 may determine if such a consumption of system resources is allowed within the predefined threshold or rules 134. In some embodiments, the power manager 130 may base the determination on the maximum level of system resource consumption indicated. In other embodiments, the power manager 130 may adjust the expected level of system resource consumption based upon the indicated level of system resource consumption as modified by other factors (e.g., system resource consumption prior to the determination or request to enter the reduced power mode, a fixed multiplier, for example 110%, etc.). In some embodiments, an indicating agent (e.g., the update manager 122, an operating system 142, a subsystem 124, etc.) may update the system resource indication as system resources are consumed by the non-interactive task 144. It is understood that the above are merely a few illustrative examples to which the disclosed subject matter is not limited.

In such an embodiment, an overriding triggering event 136 may be created or caused by the determination of the power manager 130 that the amount of system resources (e.g., bandwidth, execution time, electrical power, etc.) consumed or expected to be consumed by the non-interactive task 144 exceeds the thresholds or rules 134. It is understood that this determination need not occur only at the time a request for the second power mode is received. Such a determination may occur during the period of postponement of the transition of the reduced power mode.

As described above, the detection of an overriding triggering event 136 may cause the power manager 130 to begin the transition of the computing device 102 to the requested reduced power mode (e.g., the Suspend power mode, etc.). In cases in which the overriding triggering event 136 occurs during the determination of whether to delay or postpone the transition to the reduced power mode, the power manager 130 may determine not to delay the transition. As described above, in various embodiments, the occurrence of certain overriding trigger events 134 (e.g., a request to re-enter the first power mode, etc.) may cause the power manager 130 to perform another action instead of transitioning the computing device 102 to the requested reduced power mode (e.g., the request to enter the reduced power mode may be withdrawn, etc.).

In various embodiments, the power manager 130 may place or transition the computing device 102 into a third power mode during the period of time in which the transition to the second or reduced power mode (e.g., Suspend power mode, etc.) is delayed or postponed. In such an embodiment, the third power mode (e.g., in this context referred to as "Pseudo-Suspend power mode" if the second power mode is the Suspend power mode, etc.) may include a power mode that consumes less system resources than the first power mode (e.g., the Working power mode, etc.), but less than the requested second power mode (e.g., the Suspend power mode, etc.).

In such an embodiment, the power manager 130 may infer that by requesting the placement of the computing device 102 into the second power mode, the user 190 does not wish to use some portions of the computing device 102 or alter the performance of portions of the computing device 102. In one embodiment, the power manager 130 may partially or selectively transition portions of the computing device 102 to the second power mode. This partial or selective transition to the second power mode (e.g., Suspend power mode) may be referred to as the third power mode (e.g., Pseudo-Suspend power mode).

In various embodiments, the third power mode and the portions of the computing device 102 to selectively or partially transfer to the second power mode may be predefined. In another embodiment, the portions of the computing device 102 to selectively or partially transfer to the second power mode may be dynamically determined based upon the system resources excepted to be consumed by the non-interactive task 144.

In a specific embodiment, if the requested second power mode is the Suspend power mode, the power manager 130 may infer that the user 190 no longer wishes to interact with the computing device 102. As such, the power manager 130 may place the computing device in a third or Pseudo-Suspend power mode, in which the display 120 and audio subsystem 124, etc. are turned off or placed in a power mode equivalent (for those components) to the second or Suspend power mode. However, other components that are required or expected to be required to execute the non-interactive task 144, such as the processor 110, memory 112, and one or more network interfaces 114 may remain in the first or Working power mode. As such, the third or Pseudo-Suspend power mode may include a power mode in which a first portion (e.g., the processor 110, etc.) of the computing device 102 is operating in the first or Working power mode and a second portion (e.g., display 120, etc.) of the computing device 102 is operating with the requested second or Suspend power mode. Transitioning the entire computing device 102 (both the first and second portions, as described above) into the requested second or Suspend power mode may be delayed or postponed until the completion of the non-interactive task 144 or an overriding triggering event 136, as described above. It is understood that the above is merely one illustrative example to which the disclosed subject matter is not limited.

In various embodiments, one or more non-interactive tasks 144 and 146 may be executed by the computing device 102. In such an embodiment, upon receiving the request to enter the second power mode, the power manager 130 may detect or determine if one or more of the executing tasks or processes are ones that may cause a delay or postponement of the transition to the second power mode. As described above, in one embodiment, this detection may be aided by a flag or other value 132. If at least one task (e.g., task 144) causes a delay, the transition to the second power mode may be delayed, as described above. In one embodiment, the power manager 130 may cause tasks or processes (e.g., application 140 and in this example task 146) that will not cause a delay in the transition to the second power mode to cease or pause their respective execution. In such an embodiment, the execution of these non-delaying tasks or processes may be ceased or paused in a manner similarly to that as if the computing device 102 had entered the second power mode.

In one embodiment, in which more than one non-interactive task may cause the power manager 130 to delay or postpone the transition to the second power mode. In one embodiment, the power manager 130 may simply allow all delay-causing non-interactive tasks (e.g., tasks 144 and 146) to execute until the current level of system resources available to the device 102 falls below the thresholds 134 and an overriding triggering event 136 is generated. Then, the power manager 130 may transition the computing device 102 to the requested second power mode, as described above, even though one or more of the non-interactive tasks 144 & 146 may not have finished their execution. Conversely, no overriding triggering event 136 may be generated, and all of the non-interactive tasks may be fully executed, at which point the power manager 103 transition the computing device 102 to the requested second power mode, as described above.

In another embodiment, the power manager 130 may be configured to determine if all, a select few, or none of the delaying non-interactive tasks 144 & 146 may be executed given the thresholds or rules 134 and the expected system resource consumption entailed with the tasks' execution. The power manager 130 may be configured to cause (e.g., via a message to the operating system 142, etc.) the execution of one or more tasks that are not expected to complete before generating an overriding triggering event 136 to be ceased or paused. In such an embodiment, the remaining non-interactive tasks may be executed while the transition of the computing device 102 to the requested second power mode is delayed.

In such an embodiment, the power manager 130 may be configured to compute the results of one or more "what-if" scenarios in which the estimated or indicated system resource consumptions associated with the respective non-interactive tasks are tested to determine if the generation of an overriding triggering event 136 (e.g., too few system resources to continue execution, etc.) would occur. In such an embodiment, the power manager 130 may select to execute the combination of non-interactive tasks that allow the greatest number of non-interactive tasks to complete without generating an overriding triggering event 136. However, other rules and selection techniques may be employed within the framework of the disclosed subject matter.

Figure 2:
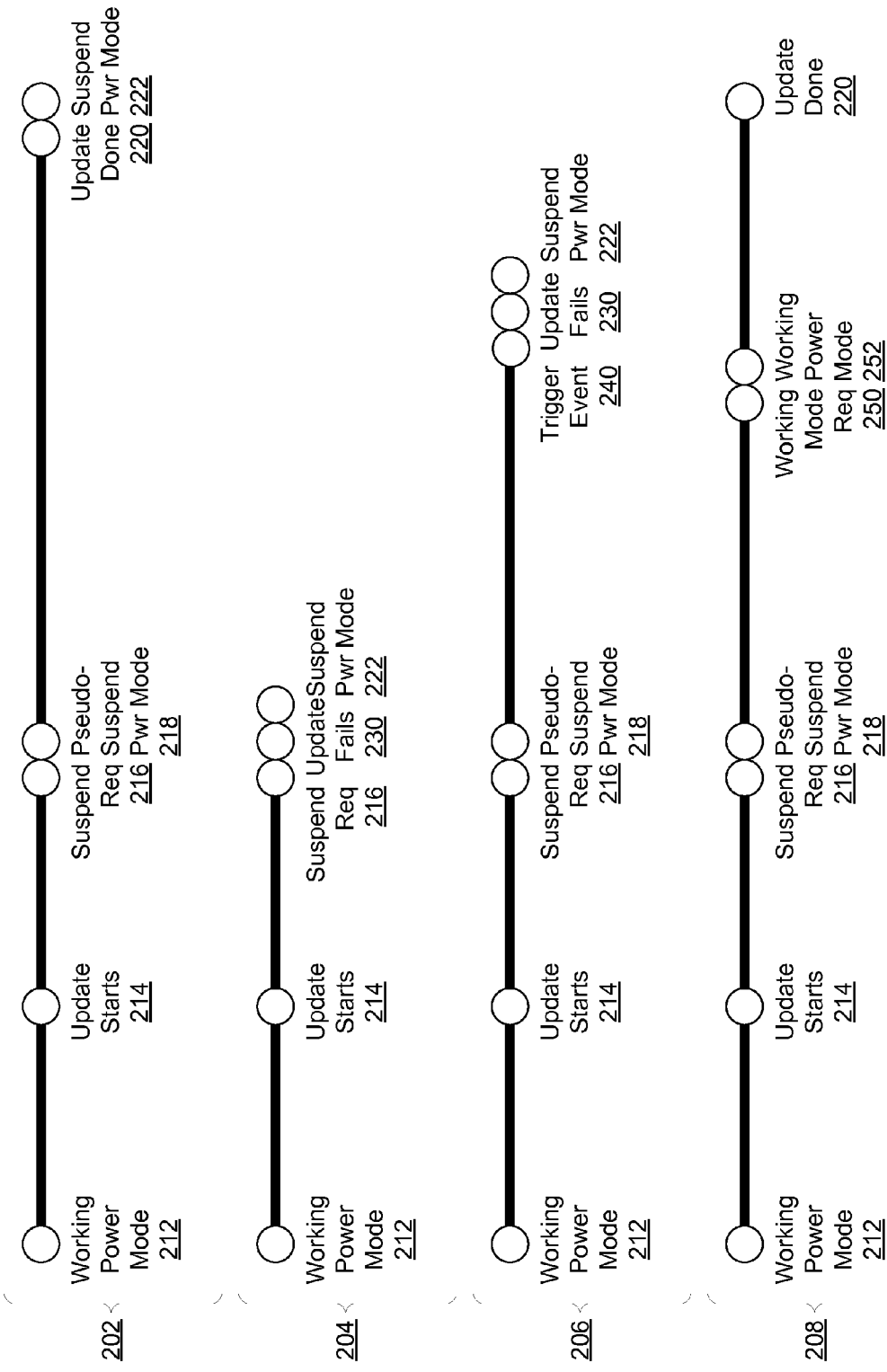
FIG. 2 is a series of diagrams of example embodiments of systems in accordance with the disclosed subject matter.

FIG. 2 is a series of timing diagrams of that performance of example embodiments of systems in accordance with the disclosed subject matter. In the illustrated embodiments, the system may include the system 100 of FIG. 1. In other embodiments, the computing devices or systems may include other components but may perform according to one or more of the illustrated or described timing diagrams.

Timing Diagram 202 illustrates that, in one embodiment, the transition of the computing device to the second power mode (e.g., Suspend power mode, etc.) may be delayed until the completion of the delaying non-interactive task. In the illustrated embodiment, the first power mode is the Working power mode, the second power mode is the Suspend power mode, and the third power mode is the Pseudo-Suspend power mode, as described above. It is understood that the above are merely a few illustrative examples to which the disclosed subject matter is not limited.

Bubble 212 illustrates that, in one embodiment, a computing device may be operating in a Working or first power mode. Bubble 214 illustrates that, in one embodiment, a non-interactive task (e.g., a software update, etc.) may start or initiate while the computing device is still operating within the Working power mode. In various embodiments, the creation of the update task may include indicating to a power manager subsystem of the computing device that a delaying non-interactive task is executing, as described above. In some embodiments, the power manager may also receive or have made available to it (e.g., via an entry in a memory location, etc.) an estimate of the amount of system resources or time required to complete the update task, as described above.

Bubble 216 illustrates that, in one embodiment, a request to transition or place the computing device in a second power mode (e.g., Suspend power mode) may be made or received. For example, the user may request entry into the Suspend power mode by pressing a special button, closing the lid of the laptop computing device, or refrain from interacting with the device for a certain period of time, etc. The computing device may determine or detect that a delaying non-interactive task is executing on the device, as described above. In various embodiments, the computing device may determine if the system resources of the device are sufficient to support the full execution of the delaying non-interactive task, as described above.

If the computing device determines that the transition to the requested second power mode may be delayed or postponed until the delaying non-interactive task has finished execution, the transition to the second power mode may be delayed. Bubble 218 illustrates that, in one embodiment, the computing device may enter a third power mode (e.g., Pseudo-Suspend power mode), as described above. For example, the display, human input devices, etc. of the computing device may be powered down or placed in a power mode substantially equivalent to component's power state in the Suspend power mode. While various other components of the computing device (e.g., the processor, memory, network interface, etc.) may remain in a power state substantially equivalent to the component's power state in the Working power mode, as described above.

Bubble 220 illustrates that, in one embodiment, after a relatively uneventful period of time, in which the full transaction of the entire computing device to the second or Suspend power mode has been delayed or postponed, the update task may naturally finish its execution and complete. Bubble 222 illustrates that, in one embodiment, the computing device may complete its transition from the first or Working power mode to the second or Suspend power mode, as described above.

Timing Diagram 204 illustrates that, in one embodiment, the transition of the computing device to the second power mode (e.g., Suspend power mode, etc.) may not be delayed despite the execution of a delaying non-interactive task. In the illustrated embodiment, the first power mode is the Working power mode, the second power mode is the Suspend power mode, and the third power mode is the Pseudo-Suspend power mode, as described above. It is understood that the above are merely a few illustrative examples to which the disclosed subject matter is not limited.

Bubble 212 illustrates that, in one embodiment, a computing device may be operating in a Working or first power mode. Bubble 214 illustrates that, in one embodiment, a non-interactive task (e.g., a software update, etc.) may start or initiate while the computing device is still operating within the Working power mode. In various embodiments, the creation of the update task may include indicating to a power manager subsystem of the computing device that a delaying non-interactive task is executing, as described above. In some embodiments, the power manager may also receive or have made available to it (e.g., via an entry in a memory location, etc.) an estimate of the amount of system resources or time required to complete the update task, as described above.

Bubble 216 illustrates that, in one embodiment, a request to transition or place the computing device in a second power mode (e.g., Suspend power mode) may be made or received. For example, the user may request entry into the Suspend power mode by pressing a special button, closing the lid of the laptop computing device, or refrain from interacting with the device for a certain period of time, etc. The computing device may determine or detect that a delaying non-interactive task is executing on the device, as described above. In various embodiments, the computing device may determine if the system resources of the device are sufficient to support the full execution of the delaying non-interactive task, as described above.

If the computing device determines that the transition to the requested second power mode may not be delayed or postponed until the delaying non-interactive task has finished execution, the transition to the second power mode may occur substantially immediately or without regard to the non-interactive update task, as described above. Bubble 230 illustrates that, in such an embodiment, the update task may terminate prematurely or have its execution ceased. In another embodiment, the execution of the update task may be paused or suspended as dictated by the second or Suspend power mode. However, in the illustrated embodiment, suspending the execution of the update task causes the update task to fail or terminate unsuccessfully. Bubble 222 illustrates that, in one embodiment, the computing device may complete its transition from the first or Working power mode to the second or Suspend power mode, as described above.

Timing Diagram 206 illustrates that, in one embodiment, the transition of the computing device to the second power mode (e.g., Suspend power mode, etc.) may be delayed until an overriding triggering event ceases the delay caused by the execution of a non-interactive task. In the illustrated embodiment, the first power mode is the Working power mode, the second power mode is the Suspend power mode, and the third power mode is the Pseudo-Suspend power mode, as described above. It is understood that the above are merely a few illustrative examples to which the disclosed subject matter is not limited.

Bubble 212 illustrates that, in one embodiment, a computing device may be operating in a Working or first power mode. Bubble 214 illustrates that, in one embodiment, a non-interactive task (e.g., a software update, etc.) may start or initiate while the computing device is still operating within the Working power mode. In various embodiments, the creation of the update task may include indicating to a power manager subsystem of the computing device that a delaying non-interactive task is executing, as described above. In some embodiments, the power manager may also receive or have made available to it (e.g., via an entry in a memory location, etc.) an estimate of the amount of system resources or time required to complete the update task, as described above.

Bubble 216 illustrates that, in one embodiment, a request to transition or place the computing device in a second power mode (e.g., Suspend power mode) may be made or received. For example, the user may request entry into the Suspend power mode by pressing a special button, closing the lid of the laptop computing device, or refrain from interacting with the device for a certain period of time, etc. The computing device may determine or detect that a delaying non-interactive task is executing on the device, as described above. In various embodiments, the computing device may determine if the system resources of the device are sufficient to support the full execution of the delaying non-interactive task, as described above.

If the computing device determines that the transition to the requested second power mode may be delayed or postponed until the delaying non-interactive task has finished execution, the transition to the second power mode may be delayed. Bubble 218 illustrates that, in one embodiment, the computing device may enter a third power mode (e.g., Pseudo-Suspend power mode), as described above. For example, the display, human input devices, etc. of the computing device may be powered down or placed in a power mode substantially equivalent to component's power state in the Suspend power mode. While various other components of the computing device (e.g., the processor, memory, network interface, etc.) may remain in a power state substantially equivalent to the component's power state in the Working power mode, as described above.

Bubble 240 illustrates that, in one embodiment, an overriding triggering event may occur and be detected by the computing device. In such an embodiment, the update task, initiated at Bubble 214, may still be executing. In various embodiments, the overriding triggering event may be caused by a change in system resources (e.g., a cessation of participation in a WLAN and the commencement of participation in a cellular data network, etc.), the exceeding of a threshold value (e.g., the update task may take too many minutes, according to a threshold value, to complete, etc.), or other triggering event, as described above. It is understood that the above are merely a few illustrative examples to which the disclosed subject matter is not limited.

As described above, in various embodiments, if the computing device detects an overriding triggering event, the transition to the second power mode may occur substantially immediately or without regard to the non-interactive update task, as described above. Bubble 230 illustrates that, in such an embodiment, the update task may terminate prematurely or have its execution ceased. In another embodiment, the execution of the update task may be paused or suspended as dictated by the second or Suspend power mode. However, in the illustrated embodiment, suspending the execution of the update task causes the update task to fail or terminate unsuccessfully. It is understood that the above is merely one illustrative example to which the disclosed subject matter is not limited. Bubble 222 illustrates that, in one embodiment, the computing device may complete its transition from the first or Working power mode to the second or Suspend power mode, as described above.

Timing Diagram 208 illustrates that, in one embodiment, the transition of the computing device to the second power mode (e.g., Suspend power mode, etc.) may be delayed until an overriding triggering event ceases the delay caused by the execution of a non-interactive task. However, in the illustrated embodiment, the overriding triggering event does not cause the entry or transition of the computing device into requested second power mode. In the illustrated embodiment, the first power mode is the Working power mode, the second power mode is the Suspend power mode, and the third power mode is the Pseudo-Suspend power mode, as described above. It is understood that the above are merely a few illustrative examples to which the disclosed subject matter is not limited.

Bubble 212 illustrates that, in one embodiment, a computing device may be operating in a Working or first power mode. Bubble 214 illustrates that, in one embodiment, a non-interactive task (e.g., a software update, etc.) may start or initiate while the computing device is still operating within the Working power mode. In various embodiments, the creation of the update task may include indicating to a power manager subsystem of the computing device that a delaying non-interactive task is executing, as described above. In some embodiments, the power manager may also receive or have made available to it (e.g., via an entry in a memory location, etc.) an estimate of the amount of system resources or time required to complete the update task, as described above.

Bubble 216 illustrates that, in one embodiment, a request to transition or place the computing device in a second power mode (e.g., Suspend power mode) may be made or received. For example, the user may request entry into the Suspend power mode by pressing a special button, closing the lid of the laptop computing device, or refrain from interacting with the device for a certain period of time, etc. The computing device may determine or detect that a delaying non-interactive task is executing on the device, as described above. In various embodiments, the computing device may determine if the system resources of the device are sufficient to support the full execution of the delaying non-interactive task, as described above.

If the computing device determines that the transition to the requested second power mode may be delayed or postponed until the delaying non-interactive task has finished execution, the transition to the second power mode may be delayed. Bubble 218 illustrates that, in one embodiment, the computing device may enter a third power mode (e.g., Pseudo-Suspend power mode), as described above. For example, the display, human input devices, etc. of the computing device may be powered down or placed in a power mode substantially equivalent to component's power state in the Suspend power mode. While various other components of the computing device (e.g., the processor, memory, network interface, etc.) may remain in a power state substantially equivalent to the component's power state in the Working power mode, as described above.

Bubble 250 illustrates that, in one embodiment, an overriding triggering event may occur and be detected by the computing device. In such an embodiment, the update task, initiated at Bubble 214, may still be executing. In the illustrated embodiment, the overriding triggering event may include a request to re-enter the Working power mode. In various embodiments, other overriding triggering events may occur in which the computing power will not transition or withdraw the request to transition to the Suspend power mode (the request received in Bubble 216). Examples of such overriding triggering events may include, but are not limited to, requests to transitions to other power modes, unrecoverable hardware failures (e.g., removal or lose of a battery, a processor thermal event, etc.), a user initiated command to belay the transition to the previously requested second power mode, etc. It is understood that the above are merely a few illustrative examples to which the disclosed subject matter is not limited.

Bubble 252 illustrates that, in one embodiment, the computing device may transition to the requested Working power mode. This may include never fully transitioning to the previously requested Suspend power mode (Bubble 216). In some embodiments, the computing device may still be operating within the Working power mode as the transition to the previously requested Suspend power mode was delayed. In such an embodiment, the computing will not transition from the Pseudo-Suspend power mode to the Working power mode.

As described above, in various embodiments, if the computing device detects an overriding triggering event, the transition to the second power mode may occur substantially immediately or without regard to the non-interactive update task, as described above. Bubble 230 illustrates that, in such an embodiment, the update task may terminate prematurely or have its execution ceased. In another embodiment, the execution of the update task may be paused or suspended as dictated by the second or Suspend power mode. However, in the illustrated embodiment, suspending the execution of the update task causes the update task to fail or terminate unsuccessfully. It is understood that the above is merely one illustrative example to which the disclosed subject matter is not limited. Bubble 222 illustrates that, in one embodiment, the computing device may complete its transition from the first or Working power mode to the second or Suspend power mode, as described above.

Bubble 220 illustrates that, in one embodiment, after a relatively uneventful period of time (as the triggering event of Bubble 250 may not have substantially affected the execution of the update task) the update task may finish its execution and complete. In the illustrated embodiment, during the update task's execution the full transaction of the computing device to the second or Suspend power mode was first delayed or postponed and then abandoned due to the request to re-enter the Working power mode, as described above.

Figure 3:
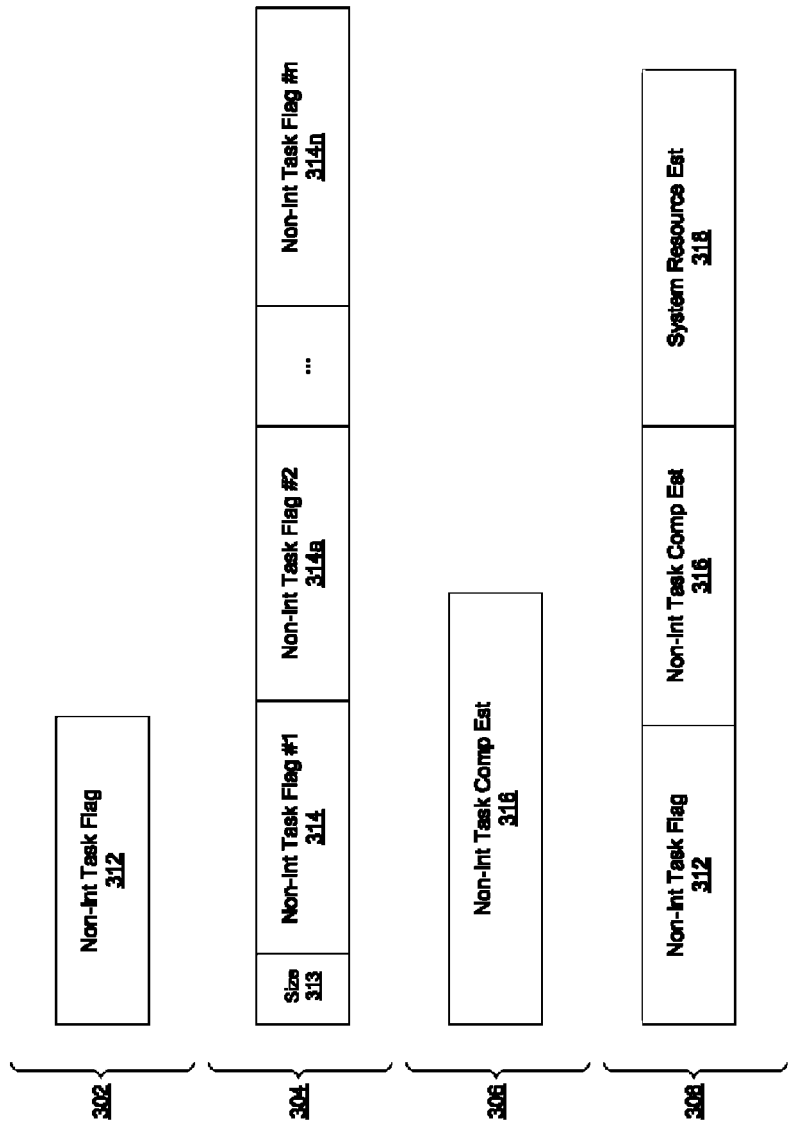
FIG. 3 is a series of diagrams of example embodiments of memory structures in accordance with the disclosed subject matter.

FIG. 3 is a series of diagrams of example embodiments of memory structures in accordance with the disclosed subject matter. In various embodiments, the memory structures may be stored within a memory of a computing device. In another embodiment, the memory may be included as part of a power manager. In yet another embodiment, the memory structure may be stored at a predetermined memory location accessible to both the power manager and one or more subsystems or components of the computing device (e.g., the update manger, an operating system, etc.).

Memory structure 302 illustrates that, in one embodiment, the memory may include a flag or a substantially 1-bit memory location to store a non-interactive task flag 312. In such an embodiment, the non-interactive task flag 312 may indicate that a non-interactive task that is being executed and that the transition to a reduced power mode should be delayed, if possible, as described above.

Memory structure 304 illustrates that, in one embodiment, the memory may include a plurality of flags (e.g., flags 314, 314a, and 314n, etc.), each configured to represent different non-interactive tasks. In one embodiment, each flag 314, 314a, etc. may be associated with a respective subsystem or component of the computing device. For example, the update manager may be associated with the flag 314 and if the flag 314 is set it indicates that an update task is being executed. Likewise flag 314a may be associated with a non-interactive task initiated by an application or other interactive process (e.g., an encoding of a video file, a compilation of source code, the downloading of a large file via a background process, etc.). Other flags may be associated with the operating system, file or data synchronizing programs (e.g., calendaring, offline email, file synchronizing, etc.), audio playing or streaming, or various application, subsystems, or components of the computing device, etc. It is understood that the above are merely a few illustrative examples to which the disclosed subject matter is not limited.

In some embodiments, multiple flag 314 may be associated with the same subsystem of the computing device. For example, in some embodiments, the update manager may be associated with two flags 314. In a specific embodiment, the update manager may be associated with a first flag for updates regarding the operating system, and the update manager may also be associated with a second flag for updates regarding applications of other software files. It is understood that the above is merely one illustrative example to which the disclosed subject matter is not limited. In various embodiments, the associations between computing device subsystems and the flags may be dynamically allocated and managed via a scoreboard table or other associating memory structure (not shown).

In some embodiments, the memory structure 304 may also include a size or header field 313 that indicates how many flags 314 are included in the memory structure 304. In another embodiment, the header field 313 may not be included (e.g., the number of flags 314 may be fixed) or, alternatively a terminating field (not shown) may be employed to indicate the end of the memory structure 304. It is understood that the above are merely a few illustrative examples to which the disclosed subject matter is not limited.

Memory structure 306 illustrates that, in one embodiment, the memory may include a field or portion 316 that indicates when a non-interactive task associated with the field 316 is expected to complete its execution. As described above, the value of the field 316 may be measured in various time values, such as, for example, seconds from initial execution of the task, number of processor cycles, absolute time (e.g., 1:00 pm, etc.), etc. In various embodiments, the memory structure 306 may include a plurality of such fields 316, each associated with a respective non-interactive task. In another embodiment, the field 316 may be shared by a plurality of non-interactive tasks. In such an embodiment, additional non-interactive tasks may add their estimated completion time to the current value stored in field 316. For example, if a first task is expected to complete in 100 processor cycles, the value 100 may be entered into the field 316. A second task may be expected to complete after 150 processor cycles, and the value of field 316 may be adjusted to 250 processor cycles. In various embodiments, the value of the field 316 may be adjusted (e.g., reduced, etc.) as the associated task(s) complete or are executed.

Memory structure 308 illustrates that, in one embodiment, the memory may include a plurality of fields associated with one or more non-interactive tasks or subsystems. For example, the flag 312 may indicate that an associated non-interactive task is being or to be executed by the computing device. The field 316 may indicate the estimated amount of time required to complete the non-interactive task. Field 318 may indicate an estimation of one or more system resources that will be consumed by the execution of the associated non-interactive task.

In some embodiments, the plurality of fields 312, 316, and 318 may be associated with a particular non-interactive task. In another embodiment, the plurality of fields 312, 316, and 318 may be associated with a particular subsystem (e.g., the update manager, etc.) and therefore all of the non-interactive tasks initiated by that subsystem. As described above, these associations may be static and predetermined or dynamically assigned.

In various embodiments, the memory structures 306 and/or 308 may be repeated or duplicated for a plurality of associated initiating subsystems or associated non-interactive tasks, similarly to memory structure 304's repetition of the flags 314. In such an embodiment, the associations may be dynamically assigned. Also, in such an embodiment, additional memory locations or elements may be allocated to the memory structures as delaying non-interactive tasks are created or terminated. In such an embodiment, the memory structure may include a header or size field 313 that indicates how many times the smaller memory structure (e.g., fields 312, 316, and 318, etc.) is repeated or duplicated in the larger memory structure.

Figure 4:
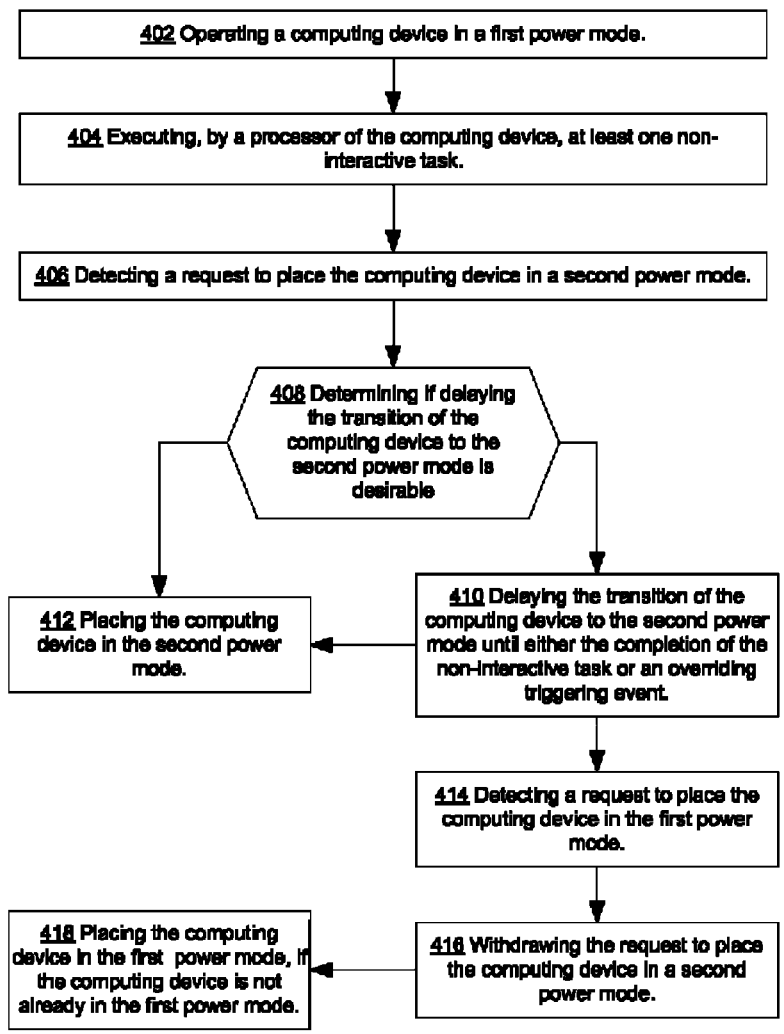
FIG. 4 is a flowchart of an example embodiment of a technique in accordance with the disclosed subject matter.

FIG. 4 is a flow chart of an example embodiment of a technique 400 in accordance with the disclosed subject matter. In various embodiments, the technique 400 may be used or produced by the systems such as those of FIG. 1 or 5. Furthermore, portions of technique 400 may be used or produced by the systems to create events or memory structures such as that of FIG. 2 or 3. It is understood that the disclosed subject matter is not limited to the ordering of or number of actions illustrated by technique 400.

Block 402 illustrates that, in one embodiment, a computing device may be operated in a first power mode, as described above. In various embodiments, this first power mode may include the Working power mode, as described above. In various embodiments, one or more of the action(s) illustrated by this Block may be performed by the apparatuses or systems of FIG. 1 or 5, the power manager of FIG. 1, as described above.

Block 404 illustrates that, in one embodiment, a computing device may execute at least one non-interactive task or background process, as described above. In various embodiments, this may include a software update activity configured to execute as a background process, as described above. In some embodiments, executing the non-interactive task or background process may include writing a value to at least one predetermined memory location, wherein the written value indicates that a non-interactive tack is being executed and that, absent an overriding triggering event, the postponement of the transition to a reduced power mode until the non-interactive task execution is complete is desired. In various embodiments, one or more of the action(s) illustrated by this Block may be performed by the apparatuses or systems of FIG. 1 or 5, the update manager, subsystem, operating system or application of FIG. 1, as described above.

Block 406 illustrates that, in one embodiment, a request to place the computing device in a second power mode may be detected, as described above. In various embodiments, this second power mode may include the Suspend power mode, as described above. In some embodiments, the second power may consume less system resources than the first power mode, as described above. In various embodiments, one or more of the action(s) illustrated by this Block may be performed by the apparatuses or systems of FIG. 1 or 5, the power manager of FIG. 1, as described above.

Block 408 illustrates that, in one embodiment, a determination may be made as to whether delaying or postponing the transaction of the computing device is desirable, as described above. In various embodiments, this determination may include estimating the amount of system resources required to complete the requested non-interactive task, and determining if the estimated amount of system resources exceeds one or more system resource threshold values, as described above. In one embodiment, this determination may include reading a memory location to determine if a value is stored in the memory location that indicates that the execution of a non-interactive tack is requested or executing, as described above. In some embodiments, the stored value may include an estimation of the amount of time required to complete the execution of non-interactive task, and determining may include determining if the estimation of the amount of time required to complete the non-interactive task exceeds a threshold value, as described above. In various embodiments, one or more of the action(s) illustrated by this Block may be performed by the apparatuses or systems of FIG. 1 or 5, the power manager of FIG. 1, as described above.

Block 410 illustrates that, in one embodiment, the transition of the computing device to the second power mode may be delayed or postponed until either the completion of the non-interactive task or an overriding triggering event, as described above. In one embodiment, delaying the transition of the computing device to the second power mode may include ceasing execution of the requested non-interactive task, and placing the computing device in the second power mode, as described above when the amount of system resources estimated for the completion of the non-interactive task (see Block 408) or the amount of system resources consumed by the non-interactive task exceeds the system resource threshold value(s). In various embodiments, delaying the transition of the computing device to the second power mode may include transitioning the computing device to the second power mode when the threshold value is exceeded. In addition, if the threshold value regarding system resources or completion time is not exceeded, a requested non-interactive task may be executed, and the transition of the computing device to the second power mode may be delayed until either the completion of the requested non-interactive task or an overriding triggering event, as described above. In various embodiments, delaying the transition of the computing device to the second power mode may include detecting when a substantial change in system resources has occurred, determining if the substantial change in system resources is an overriding triggering event, and if an overriding triggering event has occurred, transitioning the computing device to the second power mode, as described above. In a specific embodiment, substantial change in system resources includes the computing device exiting a first network and joining a second network, as described above. In yet another embodiment, delaying the transition of the computing device to the second power mode may include placing the computing device in a third power mode, where the third power mode consumes less system resources than the first power mode but consumes more system resources than the second power mode, and facilitates the execution of the non-interactive task, as described above. In various embodiments, one or more of the action(s) illustrated by this Block may be performed by the apparatuses or systems of FIG. 1 or 5, the power manager of FIG. 1, as described above.

Block 412 illustrates that, in one embodiment, the computing device may transition to, or be placed in, to the second power mode, as described above. In some embodiments, this may occur because it is not desirable to delay the transition to the second power mode, as described above. In another embodiment, this may occur because the non-interactive task has completed its execution or an overriding triggering event has occurred, as described above. In various embodiments, one or more of the action(s) illustrated by this Block may be performed by the apparatuses or systems of FIG. 1 or 5, the power manager of FIG. 1, as described above.

Block 414 illustrates that, in one embodiment, a request to place the computing device in the first (or another) power mode may be detected, as described above. In such an embodiment, this request may occur prior to the completion of the non-interactive task, as described above. In various embodiments, this request may be considered an overriding triggering event, as described above. In various embodiments, one or more of the action(s) illustrated by this Block may be performed by the apparatuses or systems of FIG. 1 or 5, the power manager of FIG. 1, as described above.

Block 416 illustrates that, in one embodiment, the request to place the computing device in the second power mode may be withdrawn or ignored, as described above. In various embodiments, one or more of the action(s) illustrated by this Block may be performed by the apparatuses or systems of FIG. 1 or 5, the power manager of FIG. 1, as described above.

Block 418 illustrates that, in one embodiment, the computing device may be placed in or transitioned to the first power mode, as described above. In such an embodiment, this may only be done if the computing device is not already in the first power mode, for example if the computing device was placed in a third power mode during the postponement of the second power mode, as described above. In various embodiments, one or more of the action(s) illustrated by this Block may be performed by the apparatuses or systems of FIG. 1 or 5, the power manager of FIG. 1, as described above.

Figure 5:
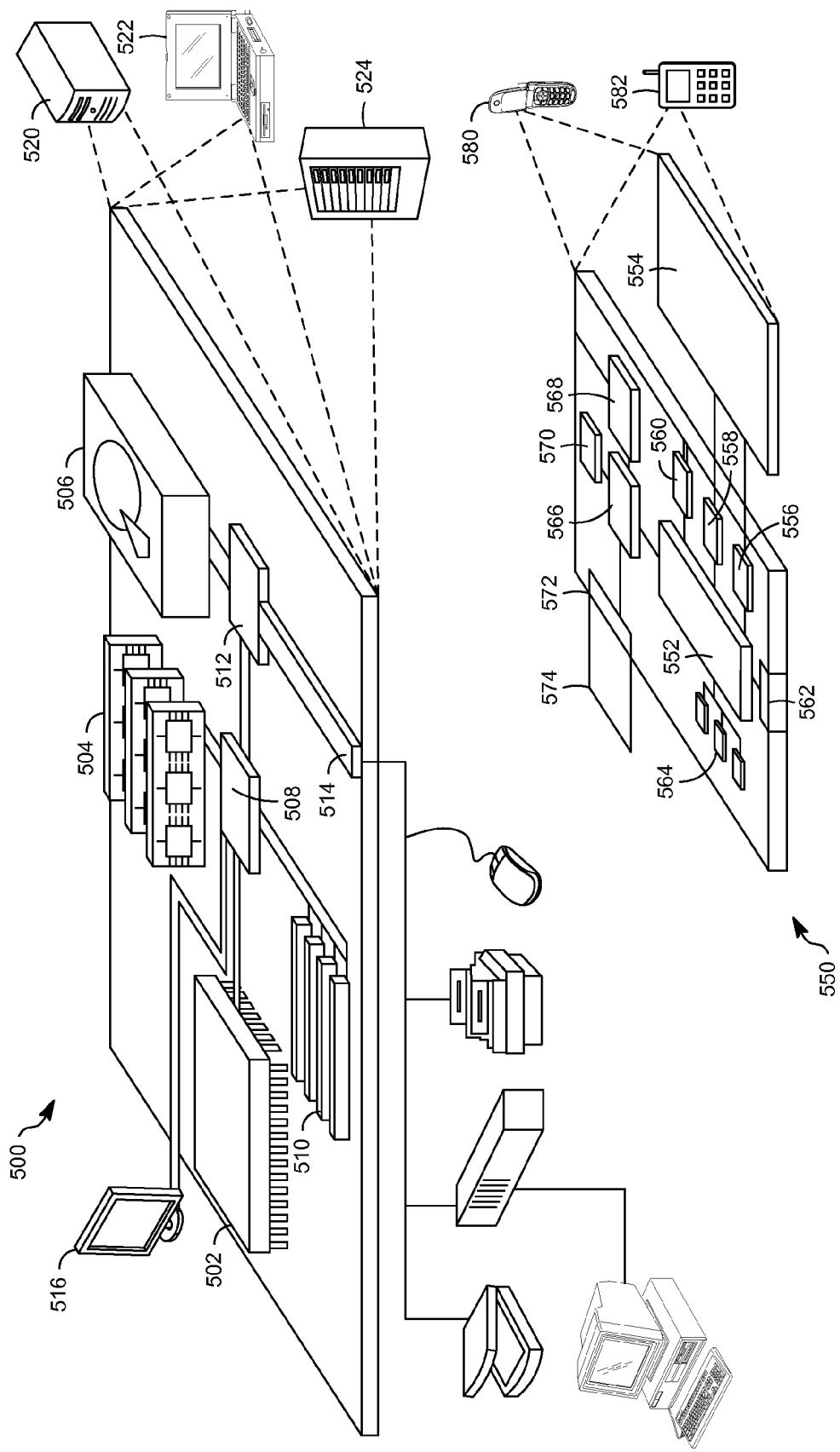
FIG. 5 is a block diagram of an example embodiment of an apparatus or system in accordance with the disclosed subject matter.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
    operating a computing device in a first power mode;
    setting at least one flag, each flag representing a respective one of at least one task being executed on the computing device;
    detecting a request to place the computing device in a second power mode, wherein the second power mode consumes less system resources than the first power mode;
    delaying the initiation of the transition of the computing device to the second power mode by placing the computing device in a third power mode that consumes less system resources than the first power mode but more than the second power mode; and
    while in the third power mode,
        estimating an amount of system resources required for each of the at least one task,
        determining if the total estimated amount of system resources to complete each of the at least one task exceeds one or more system resource threshold values, and
        if the estimated total amount of system resources exceeds the one or more system resource threshold values, ceasing execution of the at least one task.

2. The method of claim 1, wherein
    the first power mode includes a working power mode, and
    the second power mode includes a suspend to random access memory (RAM) power mode.

3. The method of claim 1, wherein the at least one task includes a task configured to execute as a background process.

4. The method of claim 1, wherein while in the third power mode:
- detecting when a substantial change in system resources by the computing device has occurred;
- determining if the substantial change in system resources exceeds the one or more system resource threshold values; and
- if the substantial change in system resources exceeds the one or more system resource threshold values transitioning the computing device to the second power mode.

5. The method of claim 4, wherein a substantial change in system resources includes the computing device exiting a first network and joining a second network.

6. The method of claim 1, wherein each of the at least one task has a different associated system resource threshold value.

7. The method of claim 1, further including:
- after detecting a request to place the computing device in a second power mode, detecting a request to place the computing device in the first power mode;
- if the request to place the computing device in the first power mode occurs prior to the completion of the at least one task, withdrawing the request to place the computing device in a second power mode.

8. The method of claim 7, wherein withdrawing the request to place the computing device in a second power mode includes placing the computing device in the first power mode.

9. The method of claim 1, wherein placing the computing device in a third power mode includes turning off a display included by the computing device.

10. The method of claim 1, wherein
- estimating an amount of system resources required based on each of the at least one task includes estimating a network bandwidth, and
- determining if the estimated amount of system resources to complete the at least one task exceeds the one or more system resource threshold values includes determining if the estimated amount of system resources to complete the at least one task exceeds a network bandwidth threshold value.

11. A computing device comprising:
- a processor configured to:
  - operate the computing device in a first power mode, and
  - set at least one flag, each flag representing a respective one of at least one task being executed on the computing device; and
- a power manager configured to:
  - receive a request to place the computing device in a second power mode, wherein the second power mode consumes less system resources than the first power mode,
  - delay the initiation of the transition of the computing device to the second power mode by placing the computing device in a third power mode that consumes less system resources than the first power mode but more than the second power mode,
  - while in the third power mode the power manager is further configured to:
    - estimate an amount of system resources required for each of the at least one task,
    - determine if the total estimated amount of system resources to complete each of the at least one task exceeds one or more system resource threshold values, and
    - if the estimated total amount of system resources exceeds the one or more system resource threshold values, ceasing execution of the at least one task.

12. The computing device of claim 11, wherein the processor is configured to indicate to the power manager when the completion of the at least one task occurs.

13. The computing device of claim 11, wherein while in the third power mode the power manager is further configured to:
- detect when a substantial change in system resources has occurred;
- determine if the substantial change in system resources exceeds the one or more system resource threshold values; and
- if the substantial change in system resources exceeds the one or more system resource threshold values, transition the computing device to the second power mode.

14. The computing device of claim 13, wherein a substantial change in system resources includes the computing device exiting a wireless local area network and joining a cellular data network.

15. The computing device of claim 11, wherein each of the at least one task has a different associated system resource threshold value.

16. The computing device of claim 11, wherein
- the power manager is configured to, while in the third power mode, detect a request to place the computing device in the first power mode, and
- if the request to place the computing device in the first power mode occurs prior to the completion of the at least one task, withdraw the request to place the computing device in a second power mode.

17. The computing device of claim 11, wherein
- estimating an amount of system resources required for each of the at least one task includes estimating a network bandwidth, and
- determining if the estimated amount of system resources to complete the at least one task exceeds the one or more system resource threshold values includes determining if the estimated amount of system resources to complete the at least one task exceeds a network bandwidth threshold value.

18. A computer program product for managing system resources, the computer program product being embodied on a non-transitory computer-readable medium and including executable code that, when executed, is configured to cause a computing apparatus to:
- operate a computing device in a first power mode;
- set at least one flag each flag representing a respective one of at least one task being executed on the computing device;
- receive a request to place the computing device in a second power mode, wherein the second power mode consumes less system resources than the first power mode;
- delay the initiation of the transition of the computing device to the second power mode by placing the computing device in a third power mode that consumes less system resources than the first power mode but more than the second power mode; and
- while in the third power mode the executable code is further configured to cause the computing apparatus to:
  - estimate an amount of system resources required for each of the at least one task, determine if the total estimated amount of system resources to complete each of the at least one task exceeds one or more system resource threshold values, and if the estimated total amount of system resources exceeds the one or more system resource threshold values, ceasing execution of the at least one task.

19. The computer program product of claim 18, wherein executable code, when executed, cause the computing apparatus to:

after detecting a request to place the computing device in a second power mode, detect a request to place the computing device in the first power mode; and if the request to place the computing device in the first power mode occurs prior to the completion of the at least one task, withdraw the request to place the computing device in a second power mode.

20. The computer program product of claim 18, wherein estimating an amount of system resources required for each of the at least one task includes estimating a network bandwidth, and determining if the estimated amount of system resources to complete the at least one task exceeds the one or more system resource threshold values includes determining if the estimated amount of system resources to complete the at least one task exceeds a network bandwidth threshold value.

* * * * *